(12) United States Patent
Cho et al.

(10) Patent No.: US 11,453,389 B2
(45) Date of Patent: Sep. 27, 2022

(54) VEHICLE EQUIPPED WITH ELECTRIC MOTOR AND PARKING CONTROL METHOD THEREFOR

(71) Applicants: Hyundai Motor Company, Seoul (KR); Kia Motors Corporation, Seoul (KR)

(72) Inventors: Jin Kyeom Cho, Suwon-si (KR); Sung Bae Jeon, Ansan-si (KR); Hui Un Son, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 205 days.

(21) Appl. No.: 17/094,109

(22) Filed: Nov. 10, 2020

(65) Prior Publication Data

US 2021/0179075 A1 Jun. 17, 2021

(30) Foreign Application Priority Data

Dec. 11, 2019 (KR) .......................... 10-2019-0164334

(51) Int. Cl.
| | |
|---|---|
| *B60W 10/08* | (2006.01) |
| *B60W 10/10* | (2012.01) |
| *B60W 10/18* | (2012.01) |
| *B60W 30/06* | (2006.01) |
| *B60W 40/06* | (2012.01) |

(52) U.S. Cl.
CPC ............ *B60W 30/06* (2013.01); *B60W 10/08* (2013.01); *B60W 10/10* (2013.01); *B60W 10/18* (2013.01); *B60W 40/06* (2013.01); *B60W 2510/1005* (2013.01); *B60W 2552/15* (2020.02)

(58) Field of Classification Search
CPC ...... B60W 10/08; B60W 10/10; B60W 10/11; B60W 10/18; B60W 10/182; B60W 30/06; B60W 40/06; B60W 40/076; B60W 2552/15; B60W 2510/1005
See application file for complete search history.

(56) References Cited

U.S. PATENT DOCUMENTS

| | | | |
|---|---|---|---|
| 2005/0258683 A1* | 11/2005 | Yamaguchi | F16D 65/18 188/162 |
| 2008/0086255 A1* | 4/2008 | Oshima | F16H 63/483 701/101 |
| 2015/0175137 A1* | 6/2015 | Murata | B60T 7/042 701/70 |
| 2017/0240148 A1* | 8/2017 | Kotera | B60T 13/741 |
| 2017/0328430 A1* | 11/2017 | Lee | F16D 65/18 |
| 2018/0345935 A1* | 12/2018 | Yasui | B60T 1/062 |

* cited by examiner

*Primary Examiner* — Edwin A Young
(74) *Attorney, Agent, or Firm* — Slater Matsil, LLP (57) ABSTRACT

A method of parking control for a vehicle equipped with an electric motor independent from a transmission includes calculating external force applied to wheels when predetermined conditions including shifting to a parking (P) stage are satisfied, determining whether a drive shaft fixing apparatus activated according to shifting to the P stage is combined, and controlling the electric motor such that a torque having a magnitude less than the external force is applied to the wheels in a direction opposite to the external force when the drive shaft fixing apparatus is determined to be combined.

20 Claims, 7 Drawing Sheets

VEHICLE EQUIPPED WITH ELECTRIC MOTOR AND PARKING CONTROL METHOD THEREFOR

CROSS-REFERENCE TO RELATED APPLICATIONS

This application claims the benefit of Korean Application No. 10-2019-0164334, filed on Dec. 11, 2019, which application is hereby incorporated herein by reference.

TECHNICAL FIELD

The present invention relates to a vehicle and a parking control method therefor.

BACKGROUND

Although vehicle driving is important, a parking process is also important because driving ends with parking. In such a parking process, various devices are used.

For example, parking is performed in such a manner that a vehicle decelerates according to operation of a brake pedal and a driver shifts a gearshift to a parking (i.e. P) stage when the vehicle stops and releases the brake pedal. Here, the operation principle of the parking stage of the transmission will be described with reference to FIG. 1.

Figure 1:
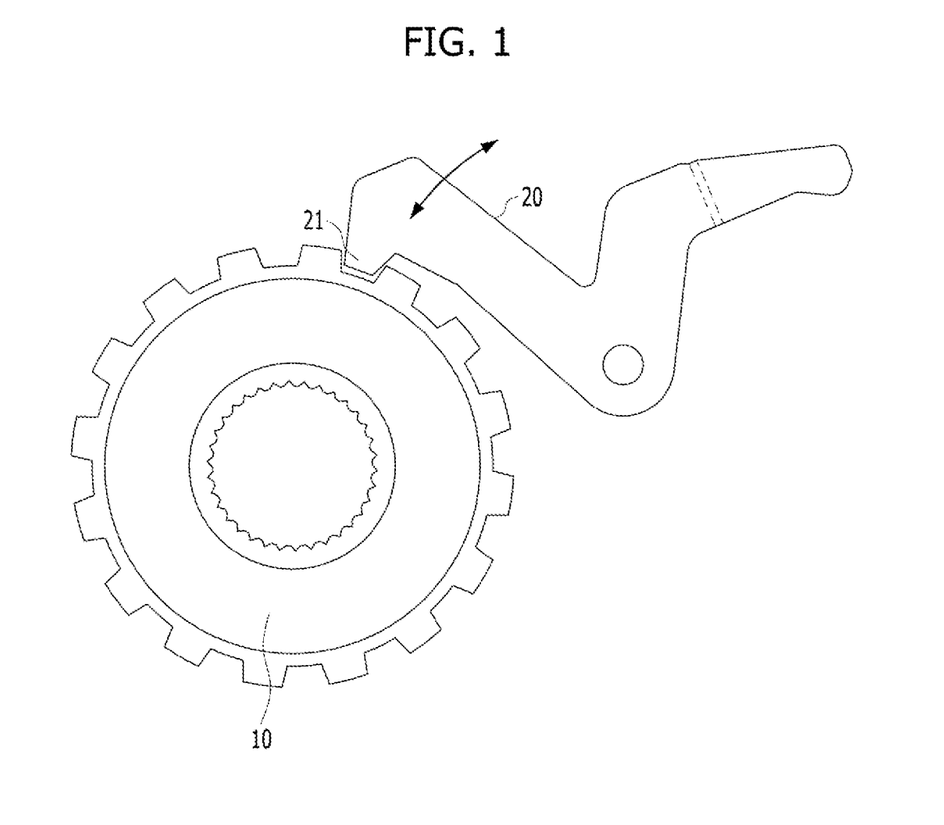
FIG. 1 is a diagram for describing the operation principle of a P stage of a general transmission.

FIG. 1 is a diagram for describing the operation principle of a P stage of a general transmission.

Referring to FIG. 1, the P stage of the transmission prevents movement of the vehicle in such a manner that a protrusion (or an insertion part) 21 of a parking sprag 20 is combined with a parking gear 10 fixed to a rotation shaft of a transmission output stage or a final reduction gear so as to mechanically fix the rotation shaft.

However, problems may be generated in the operation of the P stage of the transmission according to situations. This will be described with reference to FIGS. 2A and 2B.

Figure 2A:
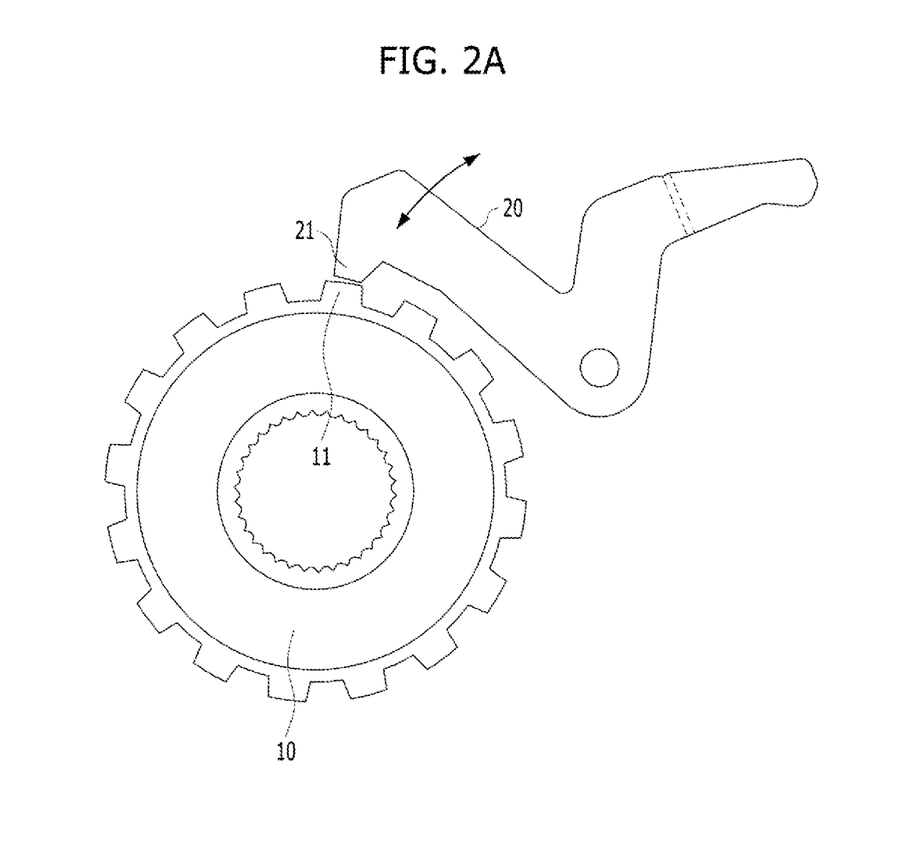
FIGS. 2A and 2B respectively illustrate a state in which a parking sprag is not combined and an impact phenomenon due to gear alignment in a P-stage operation of the general transmission.
Figure 2B:
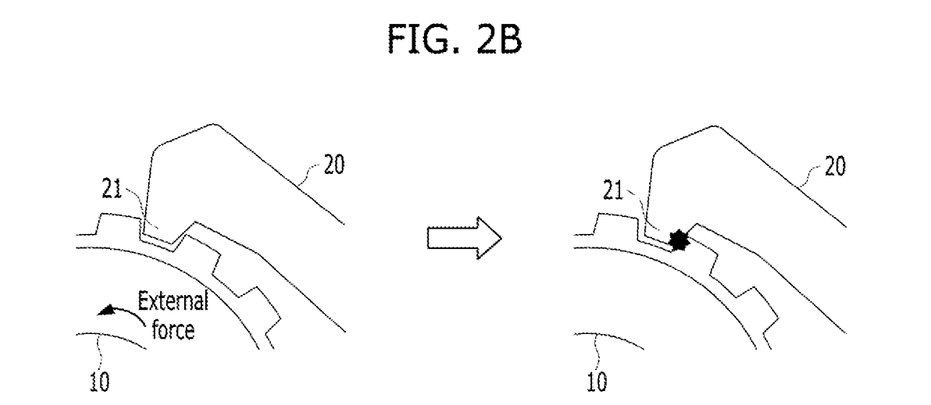

FIGS. 2A and 2B respectively illustrate a state in which the parking sprag is not combined and impact due to gear alignment in the P-stage operation of a general transmission.

Referring to FIG. 2A, there are cases in which the insertion part 21 is stopped by the end of a sawtooth 11 and thus is not engaged with the sawtooth while the parking sprag 20 is intended to move to a combination position between two arbitrary sawteeth in the P stage.

In addition, as illustrated on the left of FIG. 2B, impact may be generated due to external force (e.g., parking on a slope, or the like) applied to the vehicle when the driver releases the brake pedal even when the parking sprag 20 is normally combined. This causes the wheel to be in a state in which it can rotate depending on an initial combination state due to backlash between the parking gear 10 and the insertion part 21. Accordingly, when the insertion part 21 comes into contact with a pitch point of an approaching sawtooth while the wheel rotates, rotation (i.e., gear alignment) abruptly stops and thus the vehicle may shake, and in severe cases, the parking sprag 20 may be damaged.

This phenomenon may become serious when the parking gear 10 rotates in a state in which the parking sprag 20 is not combined with the parking gear 10 as illustrated in FIG. 2A. Particularly, when the driver releases the brake pedal while a fellow passenger is alighting, the fellow passenger may be injured. However, when the gearshift is shifted to the P stage in a general vehicle equipped with an internal combustion engine, engine power cannot be transmitted to the axle, and thus rotation of the parking gear 10 due to external force cannot be prevented when the brake pedal is released. However, since a torque may be transmitted to a drive shaft irrespective of a transmission state in a certain electromotive vehicle configuration, a method of using this to prevent impact during gear alignment due to a state in which the parking sprag is not combined with the parking gear in the P state of the transmission or external force is required.

SUMMARY

The present invention relates to a vehicle and a parking control method therefor. Particular embodiments relate to a vehicle and a parking control method therefor which can prevent impact due to a mechanical axle fixing device or damage caused by the impact at the time of shifting to a parking stage under a specific condition in a vehicle equipped with an electric motor.

An embodiment of the present invention provides a vehicle and a parking control method therefor which can prevent a not-combined state or impact due to external force at the time of shifting to a P stage for parking of a vehicle equipped with an electric motor.

It will be appreciated by persons skilled in the art that the objects that could be achieved with the present invention are not limited to what has been particularly described hereinabove and the above and other objects that the present invention could achieve will be more clearly understood from the following detailed description.

In an embodiment, a parking control method of a vehicle equipped with an electric motor independent from a transmission includes calculating external force applied to wheels when predetermined conditions including shifting to a parking (P) stage are satisfied, determining whether a drive shaft fixing means activated according to shifting to the P stage is combined, and controlling the electric motor such that a torque having a magnitude less than the external force is applied to the wheels in a direction opposite to the external force when the drive shaft fixing means is combined as a result of the determination.

In another embodiment of the present invention, a vehicle includes an electric motor independent from a transmission, a drive shaft fixing means activated according to shifting to a parking (P) stage, and a controller including a determination unit configured to calculate external force applied to wheels when predetermined conditions including shifting to the P stage are satisfied and to determine whether the drive shaft fixing means activated according to shifting to the P stage is combined, and a control unit configured to determine a target torque of the electric motor such that a torque having a magnitude less than the external force is applied to the wheels in a direction opposite to the external force when the drive shaft fixing means is combined as a result of the determination.

In the vehicle equipped with an electric motor according to at least one embodiment of the present invention configured as above, when external force causing wheels to move is applied during a parking process, impact can be prevented by applying a torque in a direction opposite to the external force through an electric motor independent from a transmission.

Particularly, impact in a P stage can be effectively prevented by applying different motor torques in a case where a parking sprag is not combined and a case where the parking sprag is combined.

It will be appreciated by persons skilled in the art that the effects that can be achieved with the present invention are not limited to what has been particularly described herein-

DETAILED DESCRIPTION OF ILLUSTRATIVE EMBODIMENTS

The detailed description of the exemplary embodiments of the present invention will be given to enable those skilled in the art to implement and practice the invention with reference to the attached drawings. However, the present invention can be implemented in various different forms and is not limited to embodiments described herein. In addition, parts that are not related to the description will be omitted for clear description in the drawings, and the same reference numbers will be used throughout this specification to refer to the same or like parts.

Throughout the specification, when it is said that some part "includes" a specific element, this means that the part may further include other elements, not excluding the same, unless mentioned otherwise. In addition, parts denoted by the same reference numeral refer to the same component throughout the specification.

Prior to description of a parking control process according to an embodiment, a vehicle configuration to which embodiments of the present invention are applicable will be described with reference to FIG. 3.

Figure 3:
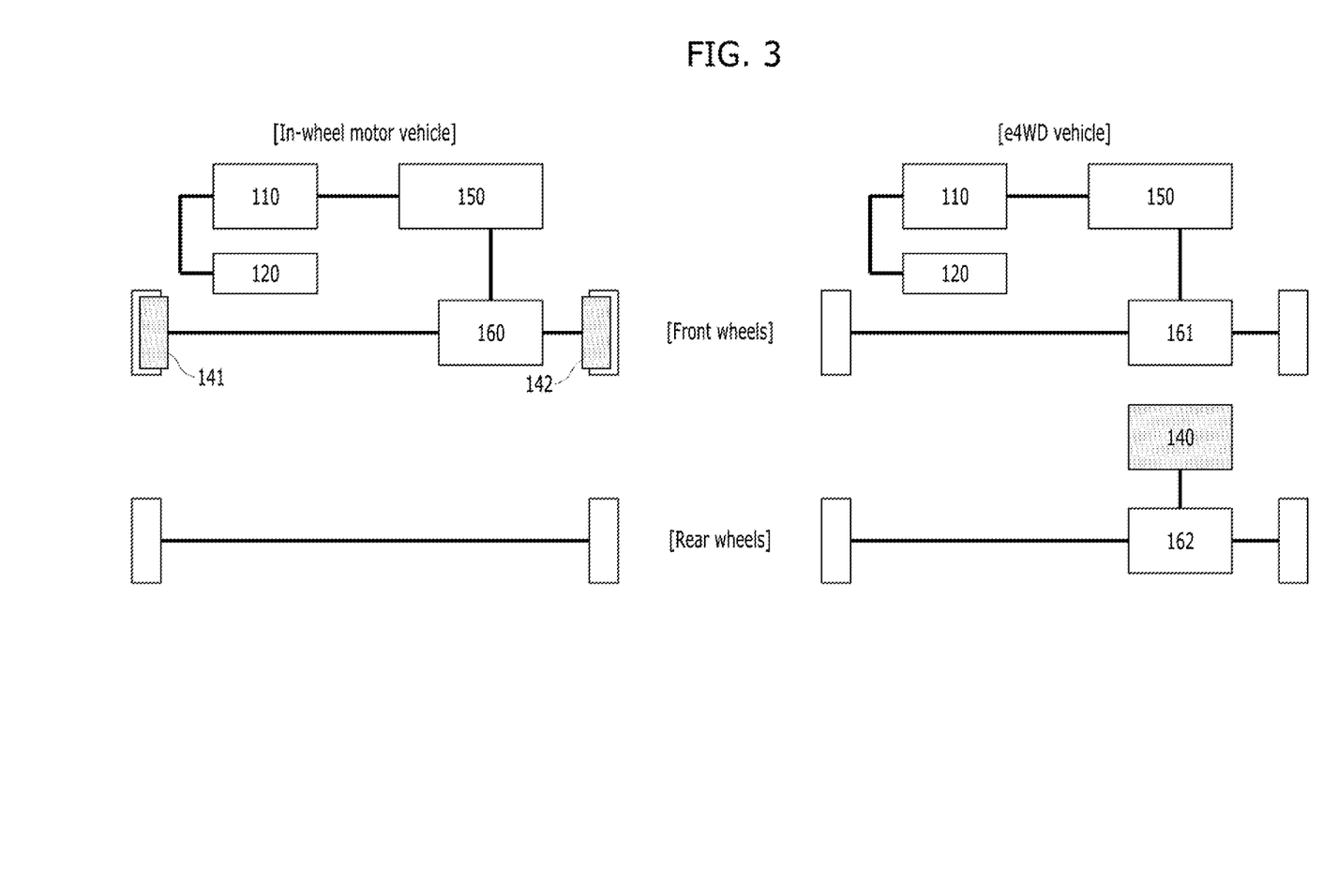
FIG. 3 illustrates powertrain configuration examples of a vehicle applicable to embodiments.

FIG. 3 illustrates powertrain configuration examples of a vehicle applicable to embodiments.

An example of a powertrain configuration of a vehicle equipped with an in-wheel motor is illustrated on the left of FIG. 3 and an example of a powertrain configuration of an electric 4-wheel drive (e4WD) vehicle is illustrated on the right of FIG. 3.

In common, a front-wheel powertrain may include an internal combustion engine (i.e., engine) 110, a hybrid starter generator (HSG) 120 connected to the engine 110 to crank the engine 110 or to generate electricity using the power of the engine 110, a transmission 150 connected to a rotation axis of the engine 110, and final reduction gears 160 and 161 connected to a transmission output stage. Here, the in-wheel motor vehicle may include motors 141 and 142 in wheels on both sides, and the e4WD vehicle may include a motor 140 in a rear wheel and thus can transmit driving power to the rear wheel through a final reduction gear 162.

The motors 141 and 142 disposed in the wheels of the in-wheel motor vehicle and the motor 140 disposed in the rear wheel of the e4WD vehicle can independently apply a torque to the wheels irrespective of a state of the transmission 150 in common.

Accordingly, an embodiment of the present invention proposes a method of preventing a state in which the parking sprag is not combined or an impact due to gear alignment by applying a torque in a direction opposite to external force through an electric motor independent from a transmission when the external force causing wheels to move is applied at the time of shifting to the P stage.

The powertrain configuration examples illustrated in FIG. 3 are exemplary and the present invention is not limited thereto. For example, the parking control method according to an embodiment is applicable to any vehicle configuration including a drive shaft fixing means using a parking gear and a parking sprag, and a power source capable of applying torque to wheels independently from the drive shaft fixing means.

Figure 4:
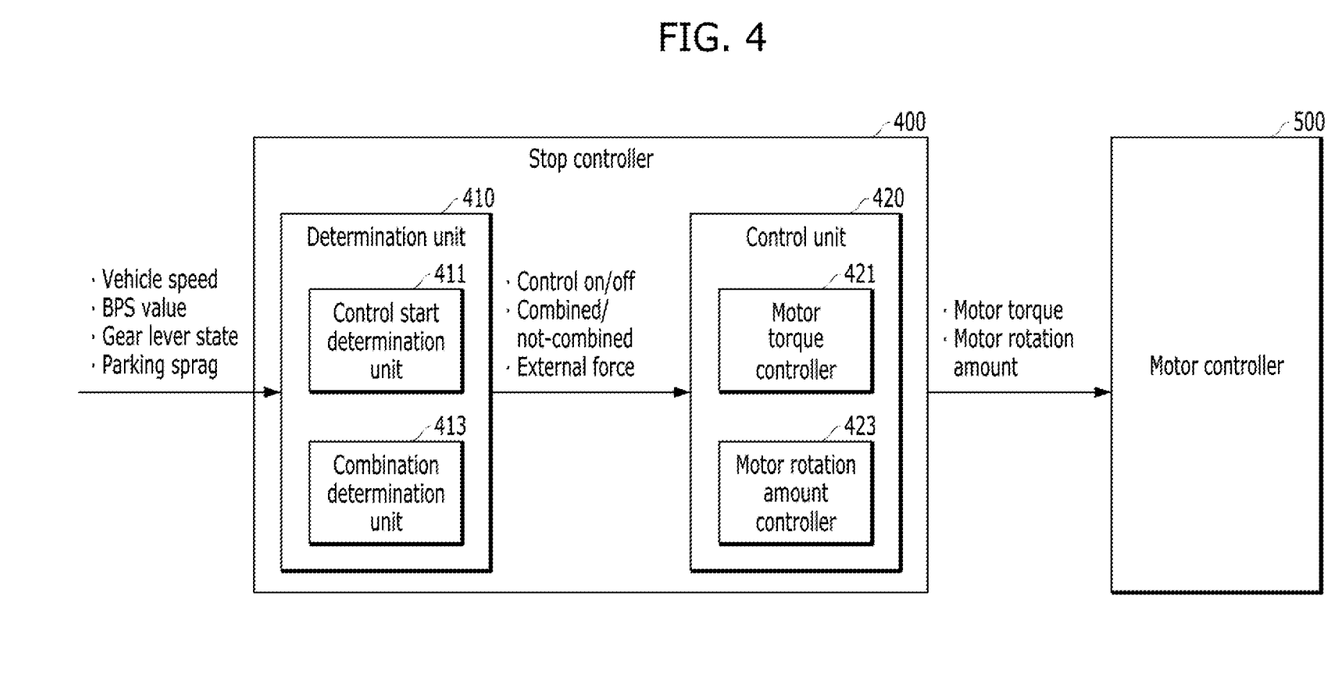
FIG. 4 illustrates an example of a configuration of a controller of a vehicle according to an embodiment of the present invention.

FIG. 4 illustrates an example of a configuration of a controller of a vehicle according to an embodiment of the present invention.

Referring to FIG. 4, a vehicle according to an embodiment may include a stop controller 400 which outputs a control command for an electric motor independent from a transmission depending on a combination stage of a parking sprag and presence or absence of external force at the time of shifting to a P stage of the transmission, and a motor controller 500 which controls at least the electric motor independent from the transmission.

The stop controller 400 may have a vehicle speed, a brake position sensor (BPS) value, a gear lever state, a parking sprag state, or the like as an input value. The vehicle speed may be acquired from an engine management system (EMS) which controls an engine when a vehicle speed sensor or the engine is included in the vehicle. In addition, the BPS value may be transmitted from a BPS and the gear lever state and the parking sprag state may be acquired from a transmission controller which controls the transmission, but the present invention is not limited thereto. For example, the parking sprag state may be determined depending on a state of an actuator which operates the parking sprag.

Here, the stop controller 400 may be a vehicle control unit (VCU) of an electric vehicle (EV) or a hybrid control unit (HCU) of a hybrid electric vehicle (HEV) which controls a powertrain of electromotive vehicles in an integrated manner or a separate controller for this function, but the present invention is not limited thereto.

Hereinafter, the operation of each component of the stop controller 400 will be described in detail.

The stop controller 400 may include a determination unit 410 which determines whether to enter parking control and a parking control type, and a control unit 420 which controls a motor on the basis of a determination result of the determination unit 410 according to an embodiment.

Here, the determination unit 410 may include a control start determination unit 411 which determines whether to enter parking control and a combination determination unit 413 which determines whether a parking sprag is combined with a parking brake according to another embodiment.

The control start determination unit 411 can determine that control start conditions are satisfied when a driver operates a brake pedal to stop the vehicle, operates a gear lever to shift from a drive stage (D stage or R stage) to a P stage, and then releases the brake pedal. In addition, the control start determination unit 411 calculates external force when the control start conditions are satisfied. Here, the external force may refer to force applied to the vehicle due to a gradient of a road on which the vehicle stops. For example, force applied to the vehicle due to a gradient is "vehicle weight*acceleration due to gravity*sin(gradient)", and the gradient can be obtained through a gradient sensor value. Further, the force applied to the vehicle is a value obtained by dividing a wheel torque T by a wheel dynamic radius on the basis of a wheel, and the wheel dynamic radius and the vehicle weight may refer to prestored values depending on vehicle specifications. The wheel torque T may correspond to a motor torque in the case of an in-wheel vehicle and correspond to a value obtained by multiplying a final reduction ratio of the final reduction gear 162 by a motor torque in the case of an e4WD vehicle. Consequently, the control start determination unit 411 can convert the magnitude of the external force into the same unit as a motor torque through calculation using the aforementioned laws of physics.

The combination determination unit 413 can determine whether the parking sprag is in a combined state as illustrated in FIG. 1 or in a not-combined state as illustrated in FIG. 2A on the basis of the position of the parking sprag acquired from the transmission controller (not shown) or state information of an actuator that drives the parking sprag.

Consequently, the determination unit 410 can output information about whether to enter control, the magnitude of external force and whether the parking sprag is combined to the control unit 420.

The control unit 420 may include a motor torque controller 421 that controls a torque of the motor independent from the transmission, and a motor rotation amount controller 423 that controls a movement amount of a gear by controlling a rotation amount of the motor.

The motor torque controller 421 determines different motor torques depending on whether the parking sprag is combined in a situation in which the control start conditions are satisfied and external force is applied. The operation of the motor torque controller 421 will be described with reference to FIGS. 5 to 6C.

Figure 5:
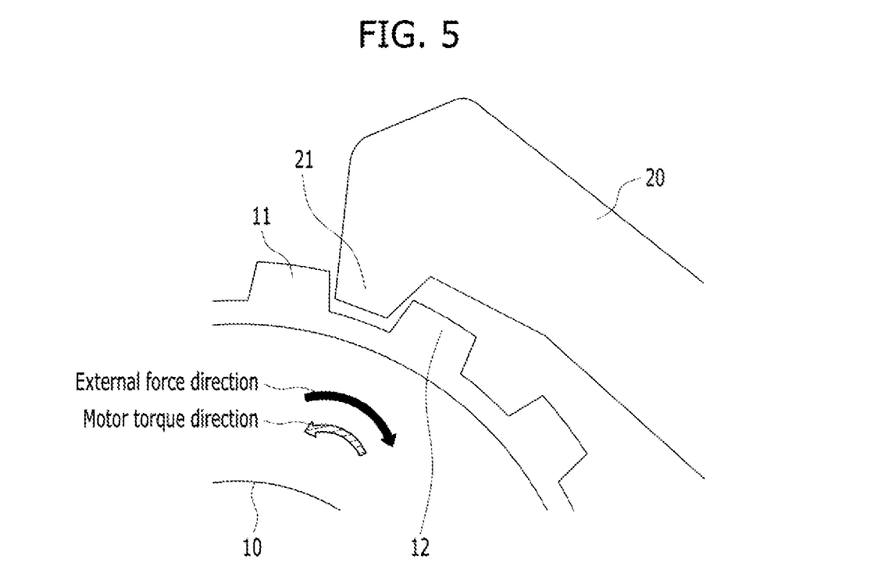
FIG. 5 illustrates an example of impact prevention control in a state in which a parking sprag is combined according to an embodiment of the present invention.

FIG. 5 illustrates an example of impact prevention control in a state in which the parking sprag is combined according to an embodiment of the present invention.

The motor torque controller 421 can determine a torque in a direction opposite to the external force and less than the external force as a target motor torque when a protrusion 21 of the parking sprag 20 is engaged between two sawteeth 11 and 12 of a parking gear 10. Accordingly, the parking gear 10 is moved by a difference between the external force and the motor torque, and thus a moving speed of the parking gear 10 and impact generated during gear alignment of the protrusion 21 and the sawtooth 12 due to movement of the parking gear 10 are reduced as compared to a case where only external force is present. Here, although the impact generated during gear alignment due to the external force decreases as the difference between the external force and the motor torque decreases, a time required for gear alignment increases. Accordingly, the motor torque controller 421 may control the motor torque such that the motor torque has a difference determined through tests from the external force or control the motor torque on the basis of a difference set through a user setting menu (USM). When a motor speed or a wheel speed becomes 0, the motor torque controller 421 may cancel motor torque application upon determining that gear alignment is completed.

Figure 6A:
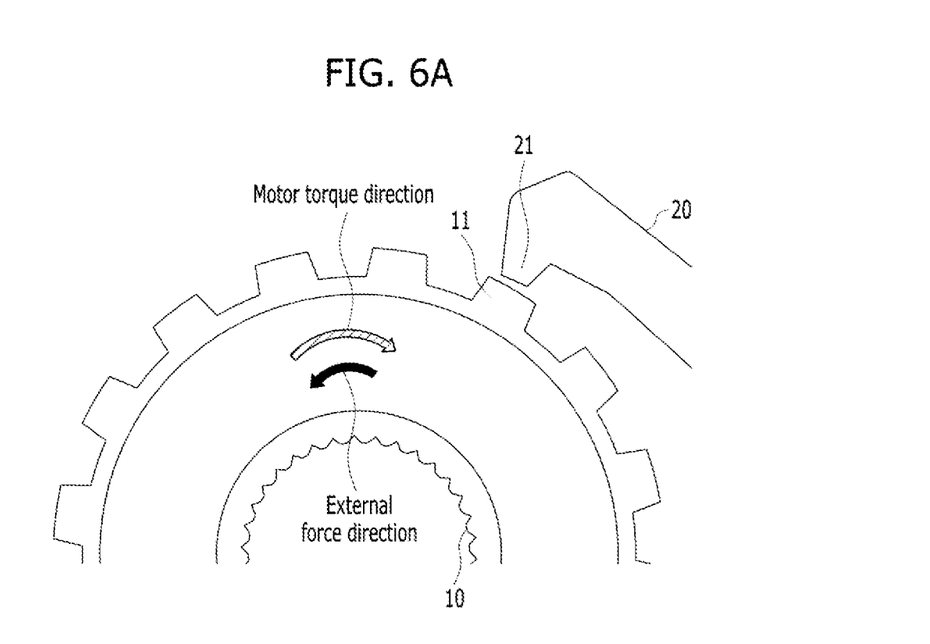
FIGS. 6A to 6C illustrate an example of impact prevention control in a state in which the parking sprag is not combined according to an embodiment of the present invention.
Figure 6B:
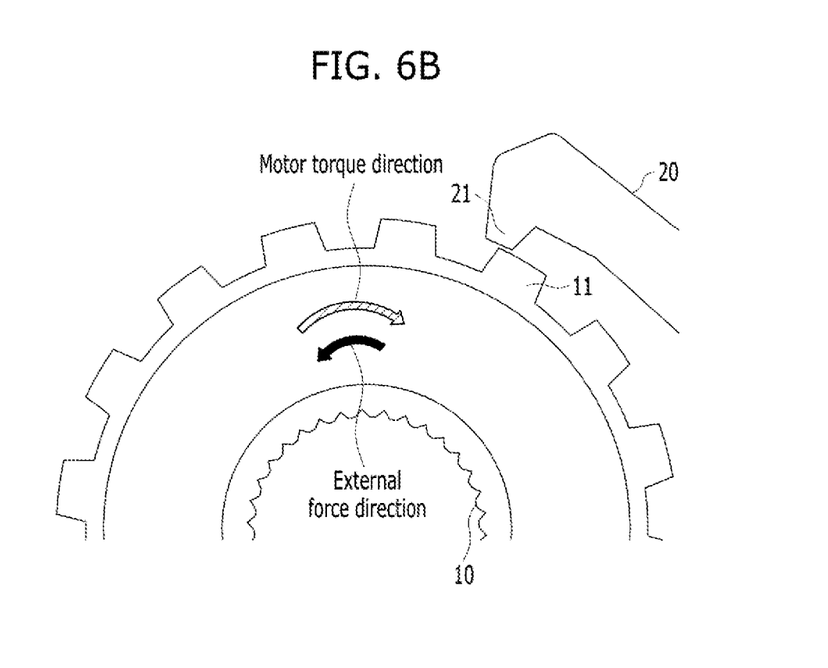
Figure 6C:
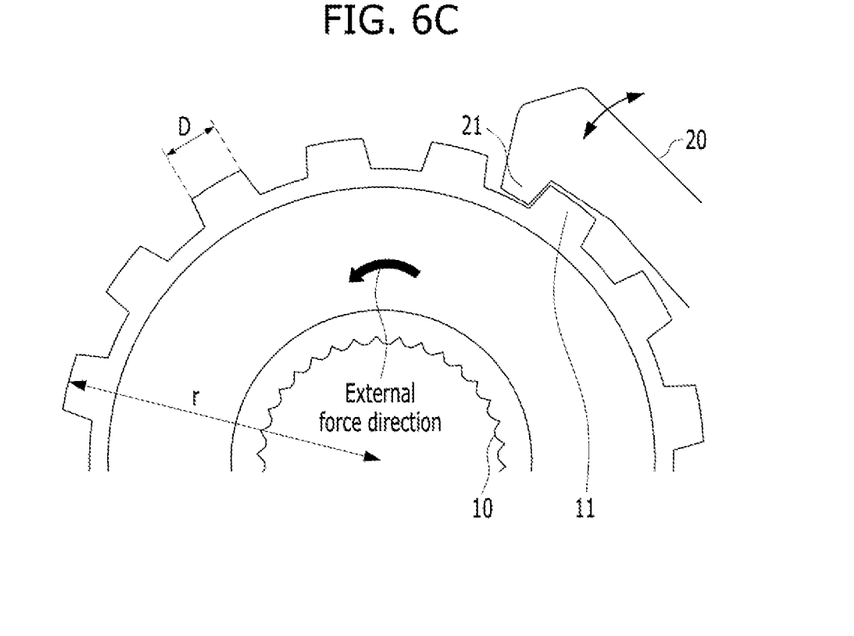

FIGS. 6A to 6C illustrate an example of impact prevention control in a state in which the parking sprag is not combined according to an embodiment of the present invention.

As shown in FIG. 6A, when the determination unit 410 determines that the parking sprag 20 is not combined with the parking gear 10, the motor torque controller 421 can determine a torque in a direction opposite to external force and greater than the external force as a target motor torque. Accordingly, the parking gear 10 is moved by a difference between the external force and the motor torque in the direction opposite to the external force, as shown in FIG. 6B, and thus the parking sprag 20 can be smoothly combined with the parking gear 10, as shown in FIG. 6C. Here, smoother combination can be achieved as the difference between the external force and the motor torque decreases, whereas a time required for combination increases. Accordingly, the motor torque controller 421 may control the motor torque such that the motor torque has a difference determined through tests from the external force or control the motor torque on the basis of a difference set through a user setting menu (USM). When the determination unit 410 detects combination of the parking sprag, the motor torque controller 421 can cancel application of the motor torque.

The motor rotation amount controller 423 can control the rotation amount of the motor to be less than a predetermined level when the parking sprag is not combined. For example, a maximum rotation amount of the motor may be within the length (i.e., 'D' of FIG. 6C) of the edge of one sawtooth in the circumferential direction of the circle diameter of the edges of sawteeth (i.e., r of FIG. 6C) of the parking gear, but the maximum rotation amount of the motor is not limited thereto. This is for the purpose of preventing impact generated during gear alignment due to unnecessary movement of the parking gear.

Figure 7:
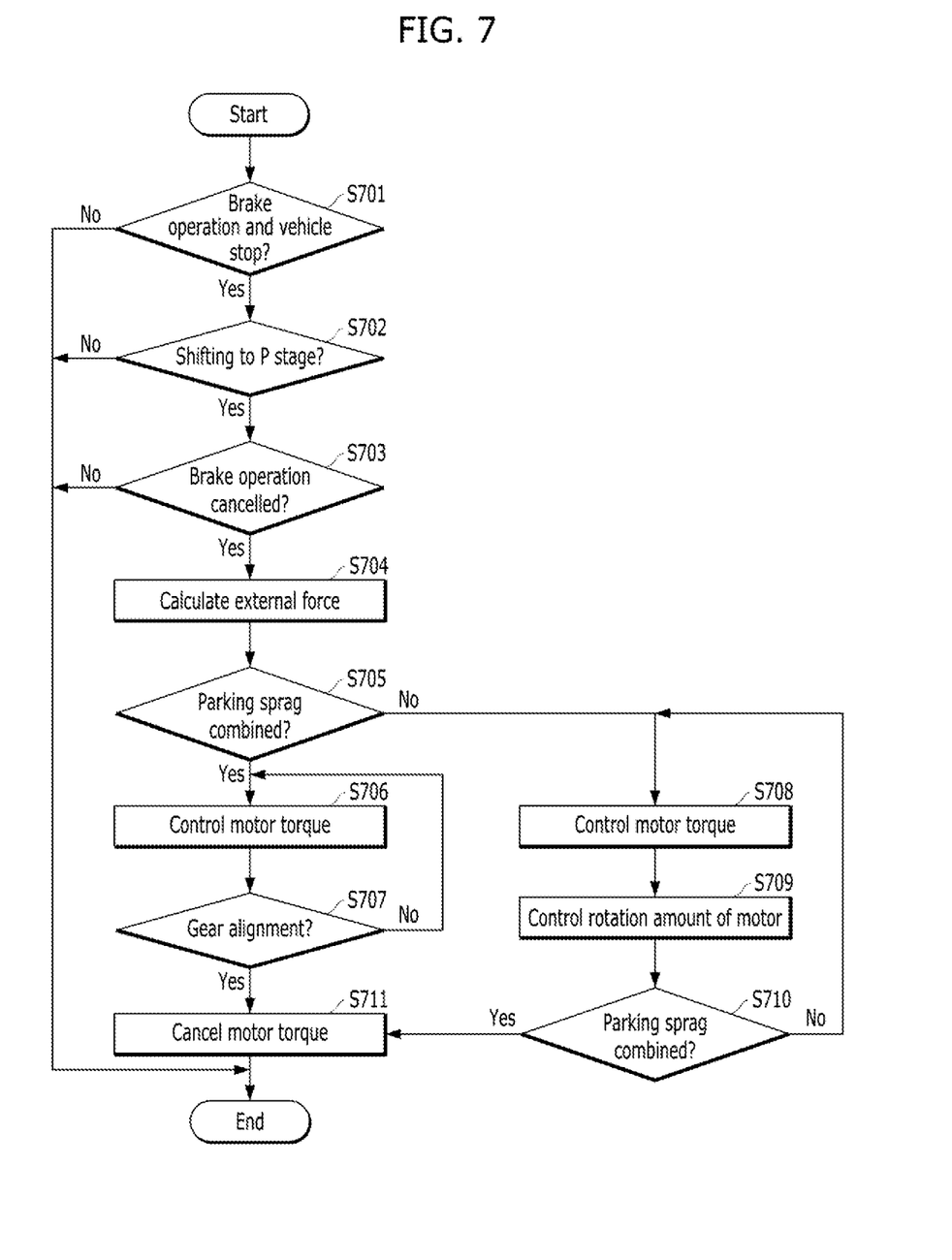
FIG. 7 is a flowchart illustrating an example of a parking control process according to an embodiment of the present invention.

The parking control process according to an embodiment is illustrated as a flowchart of FIG. 7.

FIG. 7 is a flowchart illustrating an example of the parking control process according to an embodiment of the present invention.

Referring to FIG. 7, the determination unit 410 may determine that the control start conditions are satisfied when brake operation and vehicle stop (S701), shifting of a transmission lever to a P stage (S702), and brake release (703) have been sequentially performed, and thus can calculate external force (S704).

In addition, the determination unit 410 may determine whether a parking sprag is combined with a parking brake (S705), and when the parking sprag is combined with the parking brake (YES in S705), the control unit 420 may control a motor torque such that a motor torque less than the external force is applied in a direction opposite to the external force (S706). Then, when gear alignment is completed (YES in S707), the control unit 420 may determine motor torque cancellation (S711).

On the other hand, when the determination unit 410 determines that the parking sprag is not combined with a parking brake (NO in S705), the control unit 420 may control the motor torque such that a motor torque greater than the external force is applied in the direction opposite to the external force (S708). Here, the control unit 420 may limit the rotation amount of the motor in order to prevent impact generated during gear alignment due to excessive rotation (S709). Thereafter, the control unit 420 may determine motor torque cancellation (S711) when combination of the parking sprag is detected (YES in S710).

According to the above-described embodiments, it is possible to prevent the parking sprag from not being combined with the parking gear and to prevent unnecessary movement of the vehicle even when the parking sprag is combined with the parking gear to prevent occurrence of accidents at the time of boarding/alighting from a vehicle. Furthermore, the commercial value of a vehicle can be improved through stabilized P-stage parking.

The above-described present invention can be realized as computer-readable code in a medium in which a program is recorded. Computer-readable media include all kinds of recording devices in which data readable by computer systems is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage device, etc.

Therefore, the above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of parking control for a vehicle equipped with an electric motor independent from a transmission, the method comprising:
   calculating external force applied to wheels when predetermined conditions including shifting to a parking (P) stage are satisfied;
   determining whether a drive shaft fixing apparatus activated according to shifting to the P stage is combined; and
   controlling the electric motor such that a torque having a magnitude less than the external force is applied to the wheels in a direction opposite to the external force when the drive shaft fixing apparatus is determined to be combined.

2. The method according to claim 1, wherein the predetermined conditions are satisfied when brake operation and vehicle stop, shifting to the P stage, and cancellation of brake operation are sequentially performed.

3. The method according to claim 1, wherein controlling the electric motor comprises controlling the electric motor such that the torque applied to the wheels and the external force have a predetermined difference therebetween.

4. The method according to claim 1, further comprising controlling the electric motor such that a torque having a magnitude greater than the external force is applied to the wheels in a direction opposite to the external force when the drive shaft fixing apparatus is determined to be not combined.

5. The method according to claim 4, wherein controlling the electric motor such that the torque having the magnitude greater than the external force is applied comprises limiting a rotation amount of the electric motor within a predetermined range.

6. The method according to claim 5, wherein the predetermined range is determined in consideration of a sawtooth size of a parking gear of the drive shaft fixing apparatus.

7. The method according to claim 4, wherein controlling the electric motor such that the torque having the magnitude greater than the external force is applied is performed until the drive shaft fixing apparatus is combined.

8. The method according to claim 4, wherein controlling of the electric motor such that the torque having the magnitude greater than the external force is applied comprises controlling the electric motor such that the torque applied to the wheels and the external force have a predetermined difference therebetween.

9. The method according to claim 1, wherein the electric motor has a drive shaft different from that of the transmission or is disposed in the wheels.

10. A non-transitory computer-readable recording medium storing a program for executing the method according to claim 1.

11. A vehicle comprising:
    a transmission;
    an electric motor independent from the transmission;
    a drive shaft fixing apparatus configured to be activated according to shifting to a parking (P) stage; and
    a controller configured to:
       calculate external force applied to wheels when predetermined conditions including shifting to the P stage are satisfied and to determine whether the drive shaft fixing apparatus activated according to shifting to the P stage is combined; and
       determine a target torque of the electric motor such that a torque having a magnitude less than the external force is applied to the wheels in a direction opposite to the external force when the drive shaft fixing apparatus is determined to be combined.

12. The vehicle according to claim 11, wherein the predetermined conditions are satisfied when brake operation and vehicle stop, shifting to the P stage, and cancellation of brake operation are sequentially performed.

13. The vehicle according to claim 11, wherein the controller is configured to determine the target torque such that the torque applied to the wheels and the external force have a predetermined difference therebetween.

14. The vehicle according to claim 11, wherein the controller is configured to determine the target torque such that a torque having a magnitude greater than the external force is applied to the wheels in a direction opposite to the external force when the drive shaft fixing apparatus is determined to be not combined.

15. The vehicle according to claim 14, wherein the controller is configured to limit a rotation amount of the electric motor within a predetermined range.

16. The vehicle according to claim 15, wherein the predetermined range is determined in consideration of a sawtooth size of a parking gear of the drive shaft fixing apparatus.

17. The vehicle according to claim 14, wherein the controller is configured to determine the target torque such that the torque having a greater magnitude is applied until the drive shaft fixing apparatus is combined.

18. The vehicle according to claim 14, wherein the controller is configured to determine the target torque such that the torque applied to the wheels and the external force have a predetermined difference therebetween.

19. The vehicle according to claim 11, wherein the electric motor has a drive shaft different from that of the transmission or is disposed in the wheels.

20. The vehicle according to claim 11, wherein the external force includes force applied to the vehicle due to a gradient of a road on which the vehicle stops.

* * * * *